(12) United States Patent
Abusch-Magder

(10) Patent No.: US 7,941,135 B2
(45) Date of Patent: May 10, 2011

(54) METHODS OF PERFORMING LIVE MONITORING OF A WIRELESS COMMUNICATION NETWORK

(75) Inventor: David Abusch-Magder, Maplewood, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 850 days.

(21) Appl. No.: 11/385,880

(22) Filed: Mar. 22, 2006

(65) Prior Publication Data

US 2007/0225023 A1 Sep. 27, 2007

(51) Int. Cl.
*H04W 24/00* (2009.01)
*H04W 4/00* (2009.01)
(52) U.S. Cl. ..................................... 455/423; 455/422.1
(58) Field of Classification Search .............. 455/67.11, 455/422.1, 423, 424, 425, 453, 466
See application file for complete search history.

(56) References Cited

U.S. PATENT DOCUMENTS

| | | | |
|---|---|---|---|
| 6,094,580 A * | 7/2000 | Yu et al. ......................... | 455/446 |
| 7,136,638 B2 * | 11/2006 | Wacker et al. ................ | 455/424 |
| 7,499,701 B2 * | 3/2009 | Salonaho et al. ............. | 455/423 |
| 2002/0110102 A1 * | 8/2002 | Wei et al. ...................... | 370/335 |
| 2005/0090244 A1 * | 4/2005 | Ammi et al. .................. | 455/423 |
| 2006/0073791 A1 * | 4/2006 | Senarath et al. ........... | 455/67.13 |
| 2006/0234752 A1 * | 10/2006 | Mese et al. .................... | 455/522 |
| 2007/0249361 A1 * | 10/2007 | Klang et al. ............... | 455/452.2 |
| 2008/0253315 A1 * | 10/2008 | Bodlaender ................. | 370/328 |

* cited by examiner

*Primary Examiner* — Michael T Thier
(74) *Attorney, Agent, or Firm* — Harness, Dickey & Pierce

(57) ABSTRACT

In a method of performing live monitoring of a wireless communication network, the network may be divided into a plurality of neighborhoods. A neighborhood may be represented by a given cell of interest and one or more neighbor cells of the cell of interest. A desired neighborhood is selected, and one or more given parameters of the selected neighborhood are monitored to evaluate network performance.

12 Claims, 8 Drawing Sheets

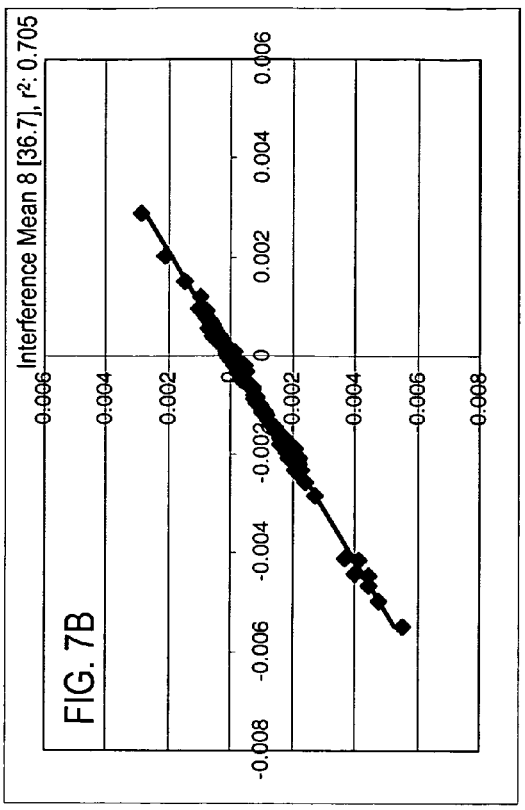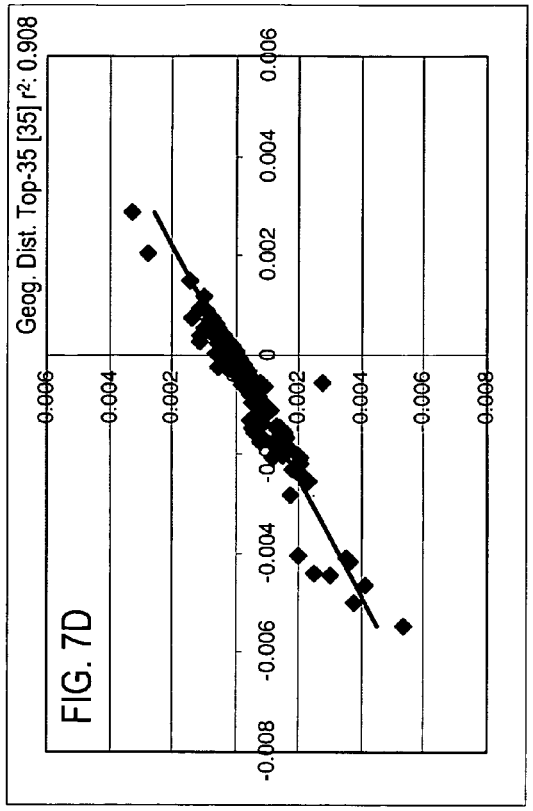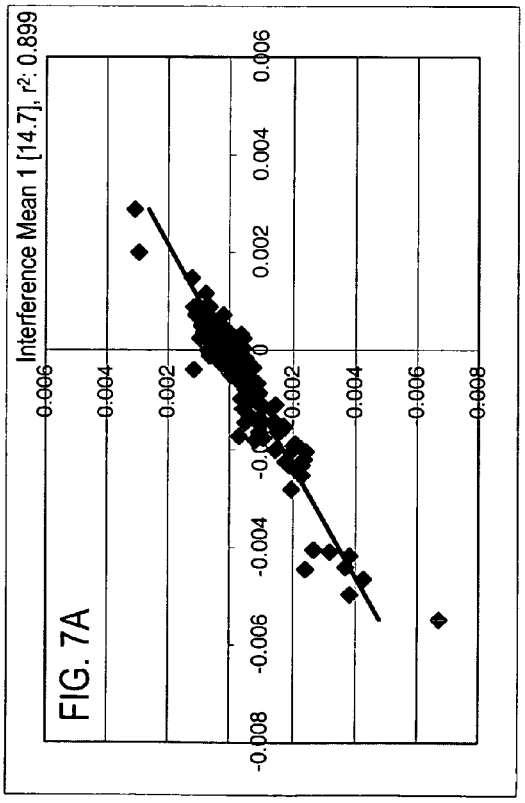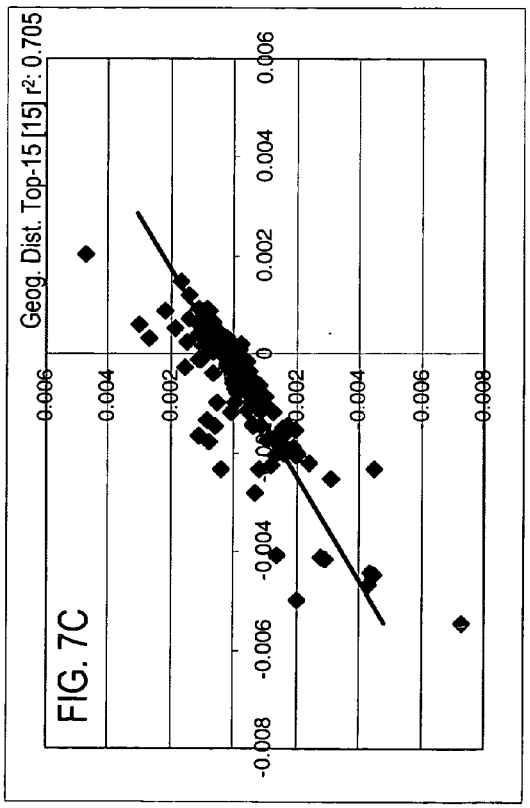

METHODS OF PERFORMING LIVE MONITORING OF A WIRELESS COMMUNICATION NETWORK

CROSS-REFERENCE TO RELATED APPLICATIONS

This application is related to co-pending U.S. patent application Ser. No. 10/325,831 to David Abusch-Magder et al., filed Mar. 7, 2005 and entitled "METHODS OF SIMPLIFYING NETWORK SIMULATION"; and to U.S. patent application Ser. No. 11/385,881 to David Abusch-Magder, filed Mar. 22, 2006 and entitled "METHOD OF CONFIGURING CELLS IN A NETWORK USING NEIGHBORHOODS AND METHOD OF DYNAMICALLY CONFIGURING CELLS IN A NETWORK USING NEIGHBORHOODS". The entire contents of each of these related applications are hereby incorporated by reference herein.

BACKGROUND OF THE INVENTION

1. Field of the Invention

The present invention relates generally to methods of performing live monitoring of a wireless communication network.

2. Description of the Related Art

Traditionally, networks can be monitored in a variety of ways to assess performance and find problems. Examples of events or parameters in the network that are monitored can include service measurements (hourly count of various events that happen in a network), per-call service measurements, which involves more detailed and voluminous data that is delivered on a per call basis, various alarms and conditions on a per cell basis, Additionally, network monitoring may include the monitoring of signaling and data channels between a cell and a centralized controller (for example, a mobile switching center (MSC)) or between a cell and other network elements (for example, another cell, or an operations and management server). This allows tracking of much more detailed data, although the comparative cost is substantial (a substantial amount of data to monitor, record, and store, and some methods of monitoring require expensive monitoring equipment which can only monitor a few cells at a time).

Network or service suppliers/providers may desire occasionally to focus on what's going on at a particular local area, such as in a given cell or several cells, rather than across a broader area of network or across the entire network. Local monitoring can be desired to assess the impact of local changes on the network (local changes such as antenna orientation, power setting, internal parameter, etc), and/or how global changes impact a particular trouble/hot spot, or to monitor potential trouble spots and/or to observe the impact of a changing traffic pattern. For example, it may be desirable to evaluate a new pattern of users (new mall, construction at a highway interchange or a new distribution of services, i.e., changes in allocation of voice versus data calls such as evaluating an increase in high-speed data use in business district).

However, conventional network monitoring can be difficult. If the supplier is monitoring only broad network information, any local effects may become obscured; if monitoring cell specific data over a broad network area, there can be a high overhead cost in data collection, processing, resources for collecting data, etc. Moreover, a poor selection of neighboring cells can result in either use of unnecessary resources (too many cells monitored), lack of pertinent information (too few cells monitored), or both (indicative of a poor choice of cells to monitor).

SUMMARY OF THE INVENTION

Exemplary embodiments are directed to a method of performing live monitoring of a wireless communication network. In an example method, the network may be divided into a plurality of neighborhoods represented by a cell of interest and one or more neighbor cells of the cell of interest. A desired neighborhood from the plurality of neighborhoods may be selected, and one or more given parameters of the selected neighborhood may be monitored to evaluate network performance.

BRIEF DESCRIPTION OF THE DRAWINGS

Exemplary embodiments of the present invention will become more fully understood from the detailed description given herein below and the accompanying drawings, wherein like elements are represented by like reference numerals, which are given by way of illustration only and thus are not limitative of the exemplary embodiments of the present invention.

FIGS. 7A-7D illustrate correlations in the change in cell coverage (Δcoverage) based on full network and neighborhood simulator after the first iteration of an exemplary greedy cell deletion algorithm.

DETAILED DESCRIPTION OF THE EXEMPLARY EMBODIMENTS

Figure 1:
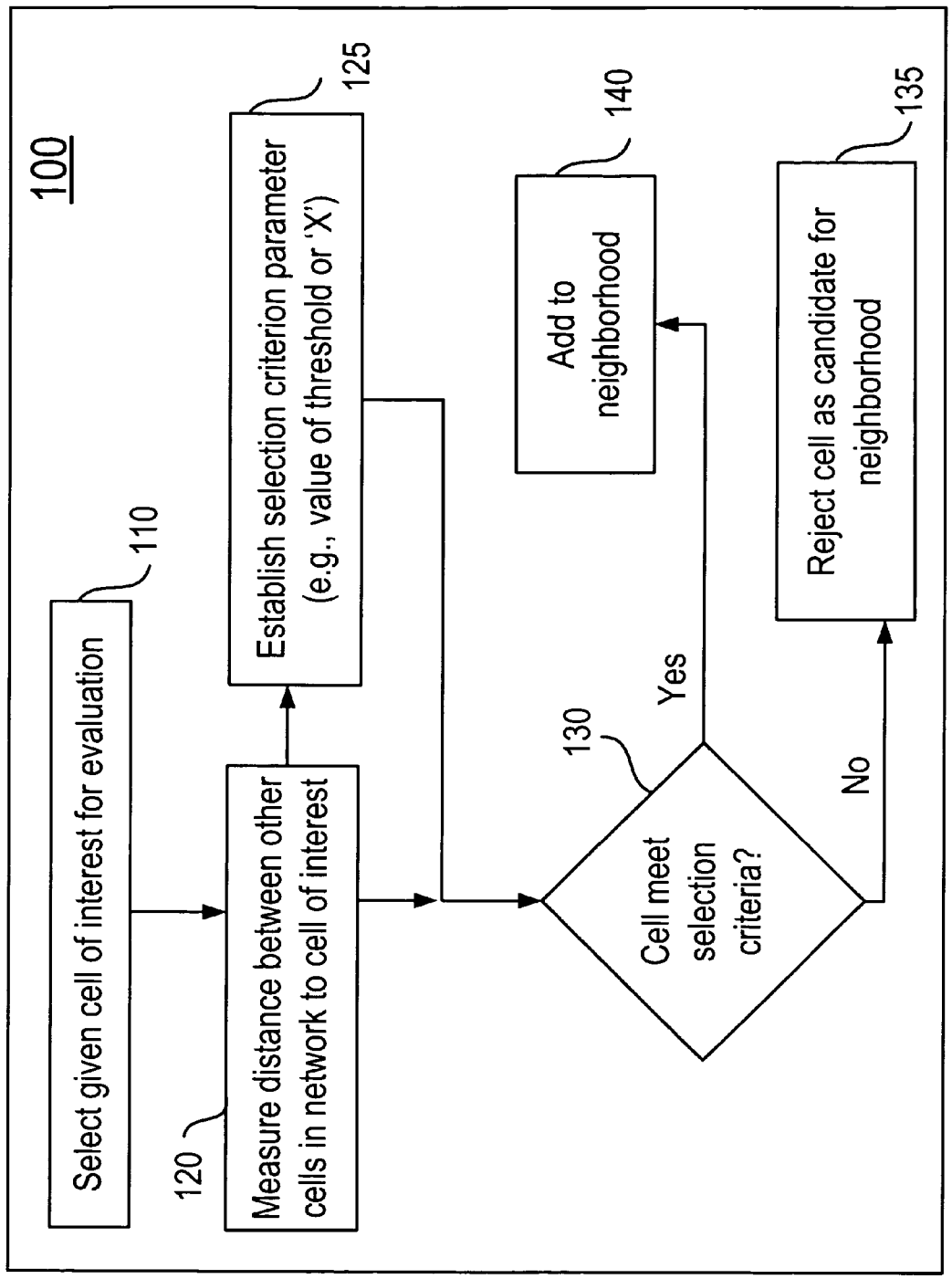
FIG. 1 is a flowchart for describing use of a distance measure and distance-based threshholding for determining a neighborhood to be used for live monitoring, in accordance with an exemplary embodiment of the present invention.

Although the following description relates to a network based on one or more of CDMA (IS95, cdma2000 and various technology variations), UMTS, GSM, 802.11 and/or related technologies, and will be described in this exemplary context, it should be noted that the exemplary embodiments shown and described herein are meant to be illustrative only and not limiting in any way. As such, various modifications will be apparent to those skilled in the art for application to communication systems or networks based on technologies other than the above, which may be in various stages of development and intended for future replacement of, or use with, the above networks or systems.

As used herein, the term mobile may be synonymous to a mobile user, user equipment (UE), user, subscriber, wireless terminal and/or remote station and may describe a remote user of wireless resources in a wireless communication network. The term 'cell' may be understood as a base station, access point, and/or any terminus of radio frequency communication. Although current network architectures may consider a distinction between mobile/user devices and access points/base stations, the exemplary embodiments described hereafter may generally be applicable to architectures where that distinction is not so clear, such as ad hoc and/or mesh network architectures, for example.

The exemplary embodiments of the present invention are directed to methods of performing live monitoring of a wireless communication network with a determinable neighborhood of cells within the network. As will be described below, and in general, the local nature of wireless radio propagation may be leveraged in order to reduce the number of cells and mobiles to be monitored as a representation of network performance. One motivation behind this locality property or approach may be understood as follows: cells located "far enough" apart should exert negligible effects on each other. For example, cells on opposite sides of a large metropolitan area should have little effect on each other.

This locality property may be exploited in an effort to achieve significant performance gains even within moderately sized markets. When trying to assess the impact of changes at a cell of interest, instead of monitoring given parameters for the full-network, one can instead monitor one or more selected parameters of a much smaller "neighborhood" around the cells of interest that will be representative of the impact those changes have on the full network.

To provide context for the exemplary embodiments described herein, the inventors provide an overview of a particular network optimization problem, generally discuss algorithms that may be used to demonstrate locality simplifications, and provide an introduction to distance measures and neighborhood selection criteria.

Cell Site Selection and Cell Deletion

Cell deletion, a variant of the well-known cell site selection problem, is an example of a computationally difficult wireless optimization problem whose solution generally requires numerous conventional large-scale network simulations. Cell deletion asks how the designer should remove k cells from a network while maximizing a network performance measure such as network coverage. This problem is relevant in planning network upgrades, when new technologies often improve network performance so that fewer cells are needed to achieve previous performance levels. The application of the neighborhood simplification to this problem exemplifies the utility of the neighborhood concept in another context, and may help guide the construction of exemplary distance metrics and selection criteria.

Distance Measures

The effectiveness of locality-based network optimization and monitoring may be influenced by the definition of "distance" between cells. It is this notion of distance that permits a neighborhood to be defined around each cell. Generally, a distance measure may be understood as a function that "measures" the "distance" between two cells. The distance need not be a simple measure of the geographic separation, but rather may be a generalization that should capture how much cells affect each other. A desirable distance measure would conclude that cells having a relatively large effect on each other are closer.

The geographic distance between two cells may be the simplest measure of distance. While cells that are geographically further apart will tend to have less effect on each other using this distance measure, simple geographic distance does not incorporate the fundamental interaction between cells—radio frequency radiation.

Radio frequency effects should thus be accounted for in order to accurately measure the distance between cells. The path loss (i.e., a measure of an attenuation signal between two points) at broadcast frequencies may serve as a desirable measure of distance to determine a given neighborhood for a cell of interest, for example. The path loss may be measured between the cell of interest and one or more points in the vicinity of another cell, and a score may be determined for other cells based on the path loss of the points in their vicinity in order to determine cells of the neighborhood.

For example, the path loss may be measured by comparing the power received from another cell by the cell of interest to the power broadcast by that other cell. In another example, the path loss may be measured by comparing the power received from the cell of interest at mobiles owned by another cell. In a further example, the path loss may be computed by measuring power from the cell of interest at points in the vicinity of another cell. The points may or may not be the mobiles owned by the other cell. In another example, a plurality of measurements can be combined into a single valued measure to be evaluated against the threshold.

Cells that have greater path loss from the cell of interest would be considered "further", regardless of the geographic distance between cells. A neighborhood may then be defined as those cells that have a path loss value below some threshold (which may be set in advance or be based on another criterion) from the cell of interest, while those cells with path loss value greater than the threshold would not be included in the neighborhood. A path loss-based distance measure would thus incorporate the local terrain, the clutter, and the propagation environment. Accordingly, once cells having a path loss metric less than the threshold are selected as cells of the neighborhood, one or more selectable parameters of the neighborhood may then be monitored to assess status or performance of the network, as reflected in the neighborhood.

However, given the frequency division duplexing used to separate the forward and reverse links in most cellular systems, it is not the forward link broadcast of one cell that interferes with another cell, but rather the interference on the reverse link. Accordingly, a modified distance measure that incorporates the deleterious reverse link interference may be desirable when assessing inter-cell interaction. By measuring the power of the reverse link interference at cell of interest A due to the mobiles in communication with another cell B, a distance measure between the two cells may thus be defined. This measure, like the reverse interference, may be dependent on the number of mobiles owned by cell B. By "owned", the cell (i.e., cell B) that is serving the mobile(s) may represent the mobiles' primary radio connection. Alternatively, any mobiles which may be in communication with a given cell (such as cell B in this example), could also represent mobiles that may be owned by cell B.

This "distance" measure, like reverse link interference, is not symmetric; the mobiles served and/or owned by cell A may have a larger effect on cell B than the effect of those mobiles served by cell B have on cell A. Yet, a distance measure based on a reverse link interference definition may be applicable to a variety of different air interfaces, and may naturally incorporate the differing interactions between cells inherent in each technology.

Distance Measures & Selection Criteria for Neighborhood Determination

When performing an application such as live monitoring around cell A, one may only need to consider the cells that are close enough to A to be relevant. This may or may not be related to the actual geographic distance between the cells. For example, a distance measure may be used to rank the other cells and their importance to the cell of interest. The selection criterion (also referred to as threshholding criterion) determines how many members of that ranked list to include as neighbors of the cell of interest. In the following examples, two different distance measures and selection criteria are presented to illustrate the impact of both the distance measure and selection criterion on determining neighborhoods to be used for performing applications such as live monitoring of network performance.

As to be illustrated in more detail hereafter, cells for a given neighborhood may be selected using several possible distance measures. In an example, defining a neighborhood including a given cell of interest to be selected for performing live monitoring thereon may be determined based on geographic distance information or another distance metric from the cell of interest. Distances measurements may be used and compared to another distance metric (i.e., selection criterion parameter) to determine a score for each cell. In an example, a score for other cells in addition to the given cell of interest may be thus determined as a function of the geographic distance of the other cells from the given cell of interest. Based on their scores, given cells may then be selected for the neighborhood.

As previously discussed, measured path loss data between a given cell of interest and one or more points in the vicinity of another cell may also be used as the distance measure to determine a score for each cell in determining the neighborhood. Further, reverse link information of those mobiles "owned" by a cell being evaluated as a possible neighbor of the cell of interest may be used to determine the neighborhood that is selected for live monitoring.

FIG. 1 is a flowchart 100 for describing use of a distance measure and a selection criterion for determining a neighborhood usable for an example live monitoring methodology, in accordance with an exemplary embodiment of the present invention. As shown in FIG. 1, a given cell in the network may be selected (110) for evaluation. In order to determine the neighborhood surrounding the selected cell, a selection criterion may be established (125) with the distance measure 120 (be it a geographic measure or another measure) to determine the neighbors of the cell of interest (140).

Thus, in one example a selection criterion parameter may be embodied as a set number of X cells in the neighborhood of the cell of interest that are closest; this may be appropriate when using a geographic distance measure. Likewise "Top-X" might be used with a different distance measure such as a measurement based on path loss or reverse interference. Accordingly, if a given cell meets the chosen selection criteria (output of 130 is 'YES'), such as the closest X cells (independent of the specific distance measure chosen) it is selected (140) as a cell of the neighborhood, i.e., as a neighbor in the neighborhood to be monitored, and/or additionally to be simulated/optimized for a given application. Those not satisfying the selection criterion (output of 130 is 'NO') are rejected (135). The value of X established for Top-X threshold can be varied based on the structure of the network to be monitored and/or simulated based on the availability of computational resources, for example.

Accordingly, as discussed above, another method of determining the neighbors of a cell is to select the "top-X" closest cells as neighbors, where X is a pre-selected constant based on the structure of the network. But this "Top-X" methodology is not the only selection technique for neighborhood determination. For example, network inhomogeneity may make it desirable to have different neighborhood sizes for different cells. For certain monitoring applications a cell in a dense, high-interference area may require more neighbors for accurate monitoring than a cell in a sparse area, for example.

Figure 2:
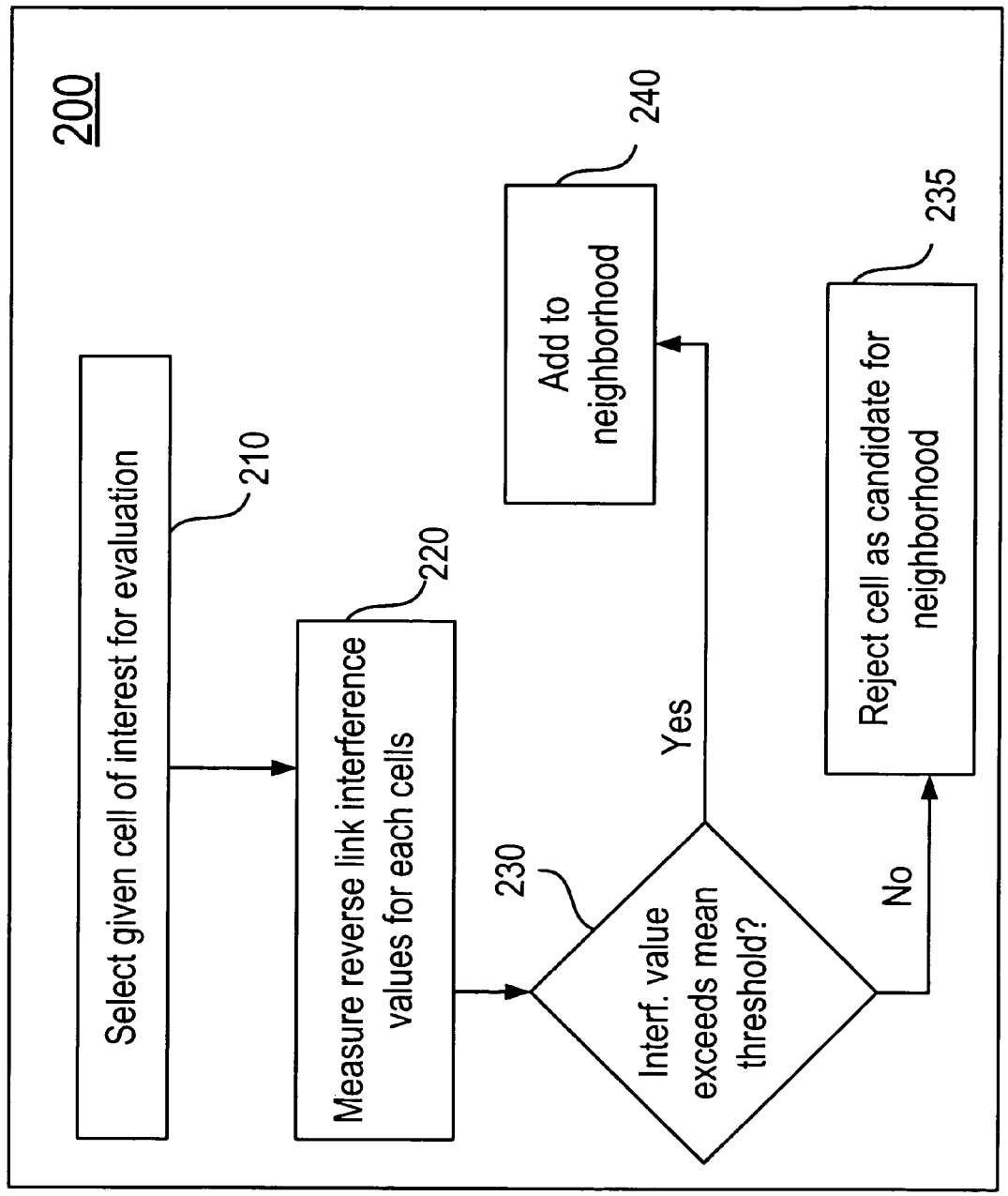
FIG. 2 is a flowchart for describing reverse link interference threshholding for determining a neighborhood to be used for live monitoring, in accordance with an exemplary embodiment of the present invention.

FIG. 2 is a flowchart 200 for describing reverse link interference threshholding for determining a neighborhood usable for an example live monitoring methodology, in accordance with an exemplary embodiment of the present invention. Measuring cells based on reverse link interference information and choosing an appropriate selection criterion may provide a neighborhood that is not restricted to the closest geographic cells. Such a neighborhood may be a more desirable choice for certain live network monitoring applications.

An interference distance measure and associated selection criterion may provide a more sophisticated methodology for defining neighbors than a distance based approach with "top-X" selection. As shown in FIG. 2, a given cell in the network may be selected (210) for evaluation. Reverse link interference values may be measured (220) for all mobiles owned by another cell that can be detected by the given selected cell. For example, if cell "A" is the cell to be evaluated, then its neighborhood will be determined. All possible other cells, i.e., cell "B", are considered as one of the "other cells" which may or may not be part of the neighborhood that is eventually determined to surround cell A. The reverse link interference at cell A caused by all mobiles in communication with cell B is determined. As previously discussed, reverse link interference refers to the radio signal(s) measured at cell A created by the mobiles in communication with cell B.

In the "mean reverse interference threshold" selection method each reverse link interference value may be compared to a reverse link interference threshold (230). The threshold is determined as a multiple of the mean value among cells with reverse link interference above the ambient noise floor. Cells whose measured reverse link interference values exceed the threshold (output of 230 is 'YES') may be selected (240) as cells comprising the neighborhood surrounding the selected cell A to be evaluated. This technique may be referred to as "reverse link interference with mean threshholding selection".

Similarly, distanced based measures may be used to rank cells as candidates for a neighborhood. Once the cells are ranked (such as by score) using the elected distance measure, the selection criterion, such as Top-X, etc, may be used to pare members from the ranked list as members to add to the neighborhood to be used for live monitoring, as a representative reflection of the neighborhood.

Figure 3:
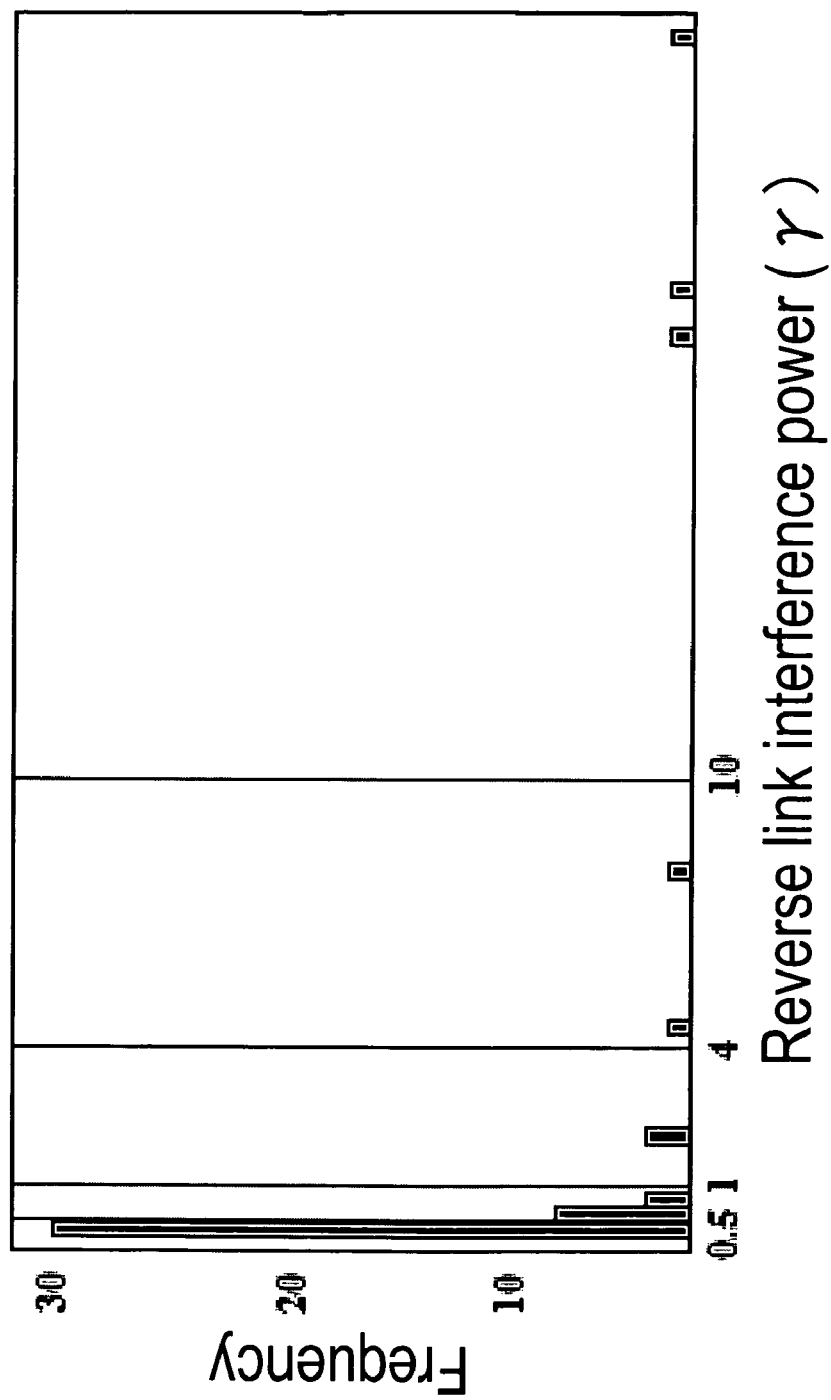
FIG. 3 is a histogram of interference power for a sample cell.

FIG. 3 is a histogram of interference power for a sample cell. The distribution of reverse link interference power (shown on a linear scale) is highly right-skewed. In other words, each cell in a network is only significantly interfered with by a small number of other cells in the network. This inherent property of wireless networks may enable neighborhoods around cells to be determined by simply selecting cells based on a threshold set to be some multiple $\gamma$ of the mean interference for cells whose interference exceed background noise, and defining the neighbors as those cells with interference greater than the threshold. In the histogram, thresholds for γ=0.5, 1, 4 and 10 are marked on the x-axis—a greater γ results in fewer neighbors.

The reverse link interference power distribution for cells is heavily right-skewed, demonstrating that most of the interference at any cell is due to a relatively small number of other cells. By choosing an appropriate interference cut-off value and selecting all-cells with interference scores greater than that value, one may thus obtain interference-based neighborhoods that are essentially independent of the total size of the network.

Accordingly, a selection criterion based on a threshold which is set to some multiple y of the linear mean of interference power for each cell may be a desirable alternative to "Top-X" selection with reverse interference power as a distance metric. Greater values of γ will result in smaller neighborhoods. A cell-specific mean interference value is used instead of a global mean interference value because cells are often in significantly different interference environments.

Figure 4:
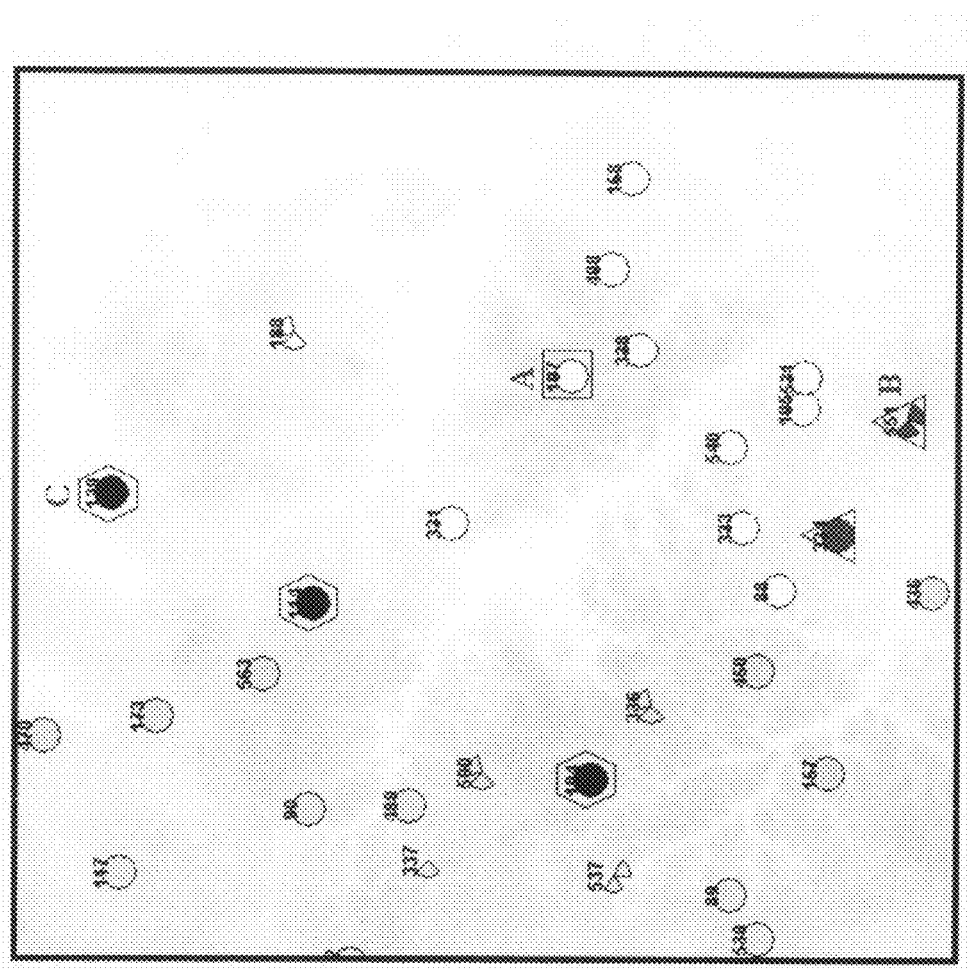
FIG. 4 is a topographic map to illustrate a comparison of neighborhoods determined by reverse link interference with mean threshholding selection and geographic distance with Top-X selection.

FIG. 4 is a topographic map to illustrate a comparison of neighborhoods determined by reverse link interference with mean threshholding selection and geographic distance with Top-X selection techniques. FIG. 4 illustrates a section of a realistic network with topography indicated in grayscale. The cell of interest that is enclosed within a square is labeled A. "Neighboring" cells chosen by both of the techniques (reverse link interference with mean threshholding selection and geographic distance with Top-X selection) are shown in white (i.e., clear, white cells).

In FIG. 4, a neighborhood size of 13 is illustrated for reverse link interference with mean threshholding selection, and a size of 14 is shown for geographic distance with Top-X selection. Cells chosen exclusively by reverse link interference with mean threshholding are shown as solid elements within a hexagon, and cells chosen exclusively by geographic distance with Top-X selection are solid and enclosed within a triangle.

FIG. 4 illustrates how reverse link interference with mean threshholding selection may provide for a more desirable neighborhood choice for the purposes of evaluating network performance. For example, reverse link interference with mean threshholding selection ignores the geographically-close cell B because it is directed away from the cell of interest A. In addition, reverse link interference with mean threshholding selection selects a distant cell labeled C, which has high-traffic and interacts significantly with A.

Live Network Monitoring with Neighborhoods

Network optimization problems distance measures and neighborhood selection criterion having been briefly discussed, methods of performing live network monitoring are described hereafter.

Figure 5:
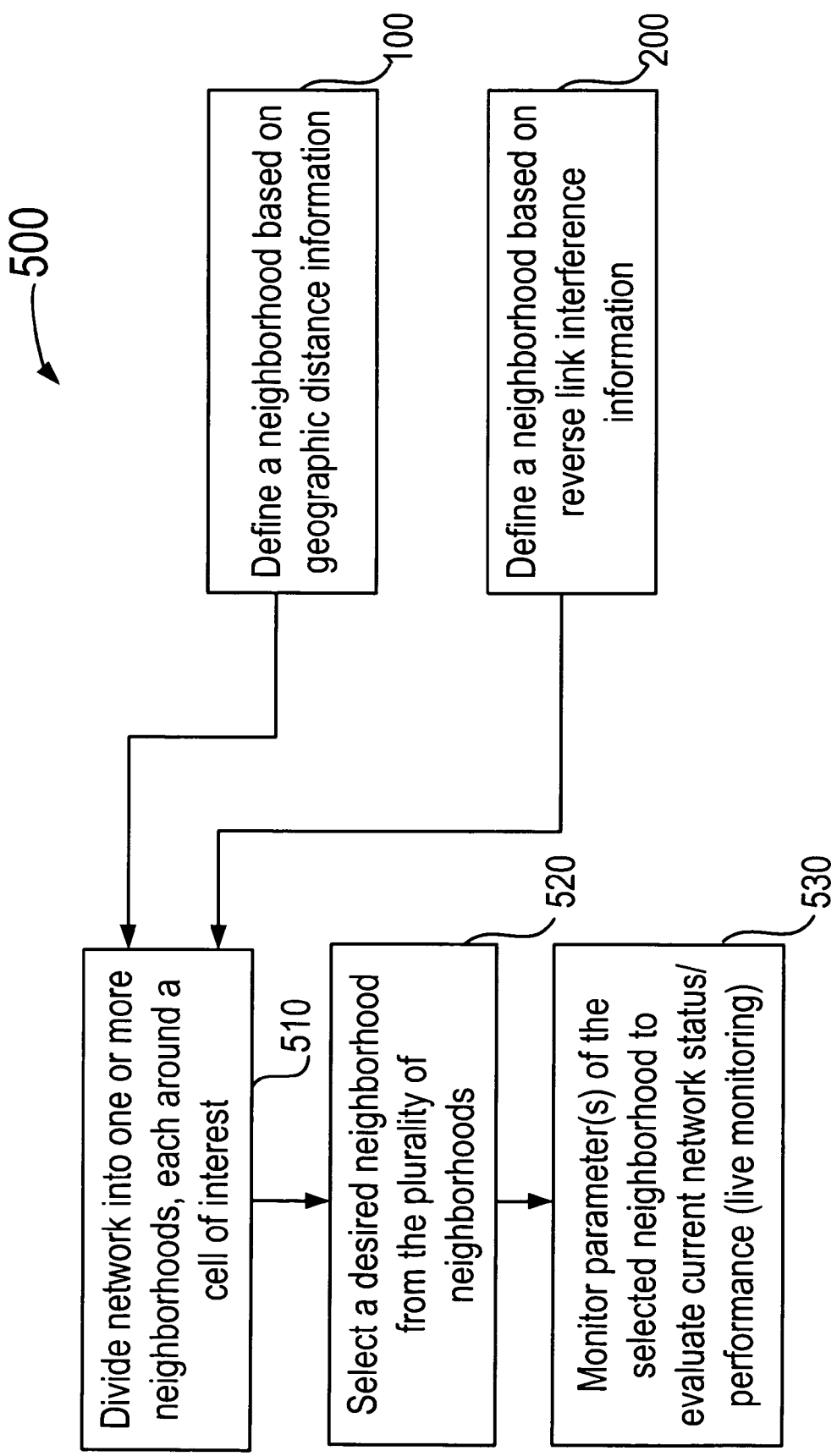
FIG. 5 is a flowchart for describing a method of performing live monitoring of a wireless communication network with a determinable neighborhood of cells within the network, in accordance with an exemplary embodiment of the present invention.

FIG. 5 is a flowchart for describing a method of performing live monitoring of a wireless communication network with a determinable neighborhood of cells within the network, in accordance with an exemplary embodiment of the present invention. As shown in FIG. 5, in an example method 500, and in general, for a given network that is to be monitored, the network may be divided (510) into one or more neighborhoods. Each neighborhood may be determined using a desired selection criterion as described in FIGS. 1 and 2. A neighborhood may be represented by a given cell to be evaluated (i.e., cell of interest) and one or more "neighbor" cells of the cell of interest. In some constructions, a neighborhood could include only the cell of interest, i.e., some cells of interest may be determined as having no neighbors.

From the plurality of determined neighborhoods, a desired neighborhood may be selected (520). Various criteria may be employed to select a desired neighborhood from the plurality of selectable neighborhoods, including, but not limited to, via implementation of simulation and optimization, by evaluation of neighborhood quality metrics as reflected by determined coefficient values, etc. For the selected neighborhood (at 520), which is representative of the entire network, one or more given parameters thereof may be monitored (530) in an effort to evaluate network performance or determine current status of the network, in the area surrounding the cell of interest.

For the selected neighborhood, parameters to monitor may in general include service measurements taken of the neighborhood, alarm conditions in the neighborhood, and/or signaling and data information within the neighborhood. Further examples of parameters that could be monitored as reflective of network status or performance may include, but are not limited to: per-call measurement data for calls originating, terminating or passing through the neighborhood; parameter settings for equipment in the neighborhood (i.e., broadcast power levels, interference levels, signal to noise (Eb/No) ratios, average number of calls, admission control parameters, etc.); settings in the backhaul network for cells in the neighborhood (i.e., IP address settings, source and destination of inter-base station messaging, error rates for backhaul transmission, utilization values for backhaul resources (such as bandwidth), latency values on backhaul); aggregated data for messages passed between cells of the neighborhood (i.e., handoff requests, handoff successes, anchor swaps, values used for maximal ratio combining, . . . ); results of data acquired at mobiles and relayed back to cells in the neighborhood; total integrated signal strength at the mobile(s), Eb/No value at the mobile(s), frame error rate (FER), mobile transmit power, etc. These parameters are merely exemplary, one of ordinary skill in the art would recognize other feasible parameters to monitor in the neighborhood that could provide a snapshot or reflection of network status and/or performance.

In another example, the results of the monitoring evaluation may then be used to perform an optimization algorithm for selecting a specific desired neighborhood to be monitored for further, specific data from a plurality of previously determined, selectable neighborhoods. Moreover, evaluation may be done on a neighborhood-by-neighborhood basis, instead of on the network as a whole.

An example of a simulation and optimization algorithms may be the iteration of the aforementioned greedy heuristic-based algorithm using one or more of the neighborhoods to optimize network performance. As these exemplary optimization algorithms are described in detail in the co-pending U.S. patent application Ser. No. 10/325,831 to Abusch-Magder et al., a further explanation thereof is omitted for purposes of brevity.

Figure 6:
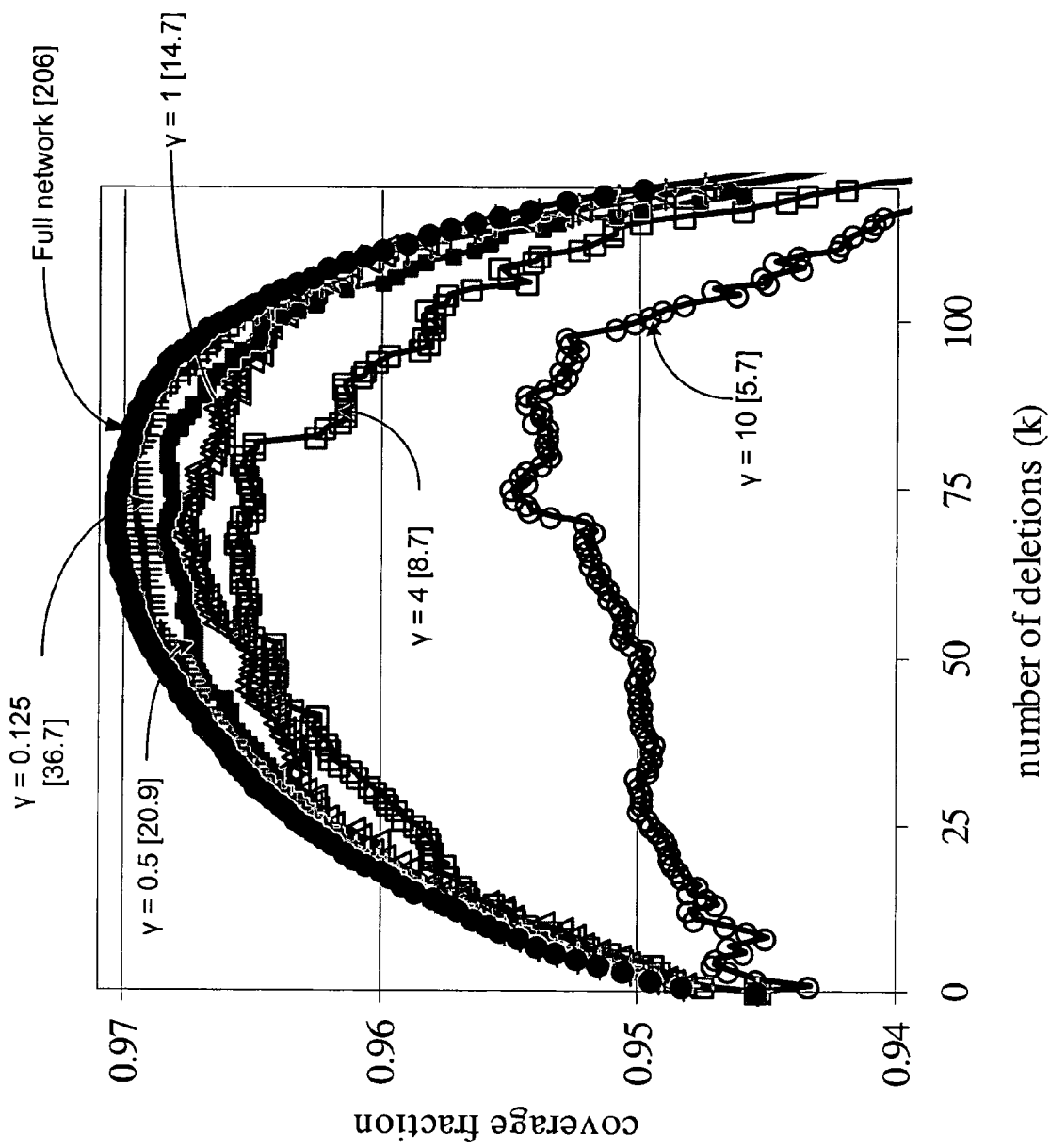
FIG. 6 illustrates simulated network performance using reverse link interference with mean threshold selection to obtain neighborhoods of different sizes on a realistic overdesigned 206-cell network.

FIG. 6 illustrates reverse link interference with mean threshholding selection on a realistic over-designed 206-cell network. As discussed above, the parameter γ represents a multiple of the linear mean of interference power for each cell. There are six (6) curves shown in FIG. 6. Referring from top to bottom (where average neighborhood size on the first iteration of the greedy cell deletion algorithm is indicated in brackets), the six curves are shown as: full network evaluation [all 206 cells] (see the "solid circle" curve), γ=0.125[36.7] (vertical line curve), γ=0.5[20.9] (solid square curve), γ=1 [14.7] (hollow triangle), γ=4[8.7] (hollow square) and γ=10 [5.7] (hollow-circle).

In FIG. 6, the γ=0.125 curve closely approximates the full-evaluation curve even though the γ=0.125 average neighborhood size is almost 6 times smaller (206 vs. 36.7 cells). Coverage increases in initial deletions because the network is over-designed and has too many cells. The resulting interference degrades the coverage. As cells are removed the interference decreases and coverage increases. After removing approximately 70 cells, the deletion of cells begins to reduce the overall coverage.

As FIG. 6 shows, locality-greedy runs produced results of similar quality as compared to conventional-greedy runs. For example, results comparable to full-evaluation greedy on a realistic 206-cell network were obtained using an average neighborhood size of 36.7. This simplification provided an algorithm runtime that was roughly 15 times faster than the conventional full-evaluation method, respectively.

FIGS. 7A-7D illustrates correlations between changes in cell coverage (Δcoverage) for a full network evaluation and for a neighborhood evaluation after the first iteration of the greedy cell deletion algorithm.

A judicious choice of neighbors surrounding the cell of interest enables capturing the behavior of the network in the vicinity of the cell of interest with fewer resources than would be required using conventional techniques, which typically may select a poor choice of neighbors. To help guide this choice and to gain perspective as to the robustness of the locality approximation and the utility of neighborhoods, in FIGS. 7A-7D the inventor has examined the change in coverage (Δcoverage) after the initial deletion of each candidate cell in the same 206-cell realistic network. The Δcoverage was plotted as computed by a full evaluation versus Δcoverage as computed by a neighborhood evaluation, and a correlation coefficient between the two was examined.

A high degree of correlations, i.e., a correlation coefficient value that is closer to 1, indicates improved accuracy. The neighborhood size needed to obtain results comparable to full-network simulation does not scale proportionately to network size; instead, it remains roughly constant. Thus, the benefits possible in monitoring or simulation introduced by locality may increase with greater network size.

In FIGS. 7A-7D, charts in the same row (7A and 7B, 7C and 7D) correspond to the same neighborhood method but different neighborhood sizes, while charts in the same column (7A and 7C, 7B and 7D) have approximately the same average neighborhood size but use different threshholding techniques and distance measures to determine the neighborhood. Average neighborhood size on the first iteration, indicated in brackets, increases from left to right. The correlation coefficient, and therefore accuracy of the locality simplification, increases as neighborhood size increases. For fixed neighborhood size, reverse link interference with mean threshholding selection has a greater correlation than geographic distance with Top-X selection.

As shown in FIG. 7B, the inventor was able to obtain a near-perfect correlation between the two values when using reverse link interference with mean threshholding selection with an average neighborhood size of 36.7, further underscoring the ability of using the example neighborhood simplification techniques to obtain accurate results. Similar methodologies based on simulation runs could be used to determine desirable neighborhood selection parameters for network monitoring. Alternatively, a simulation procedure could be carried out to determine relative utility of neighborhood size/composition based on monitored results. Thereafter, those parameters may form the basis for a full-blown network monitoring application.

Figure 8:
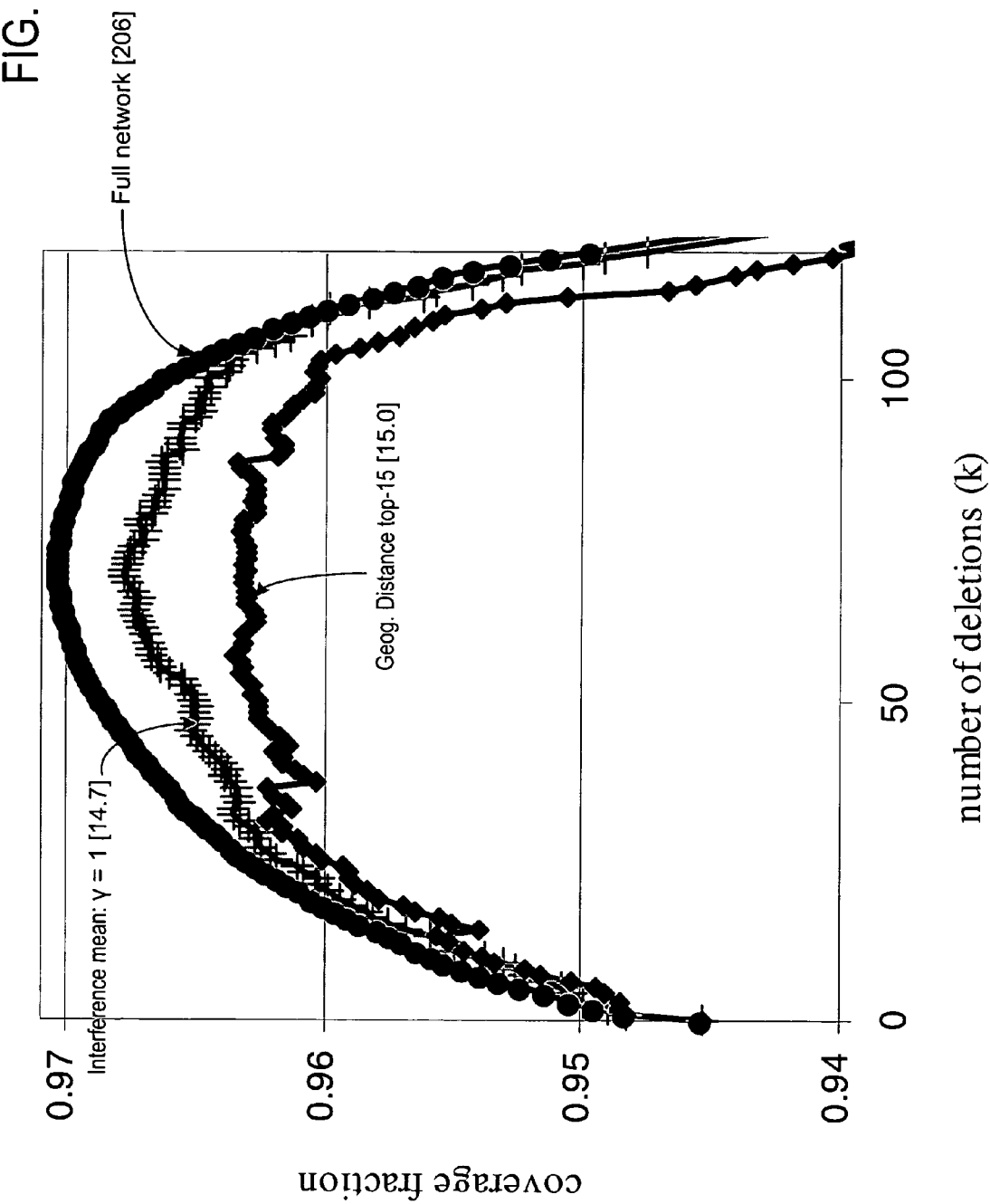
FIG. 8 is a graph illustrating a comparison of the simulated performance of the greedy cell deletion algorithm for neighborhoods determined by reverse link interference with mean threshholding selection versus neighborhoods determined by geographic distance with Top-X selection.

Choice of Distance Measure and Selection Criterion Affects Quality of Monitored Data FIG. 8 is a graph illustrating a comparison of the use of a greedy algorithm with neighborhoods determined by reverse link interference with mean threshholding selection versus neighborhoods determined by geographic distance with Top-X selection. In FIG. 8, greedy deletion runs on a 206-cell realistic network using different neighborhood definitions. Top to bottom (average neighborhood size on first iteration in brackets): full [206], interference mean with γ=1[14.7], geographic distance with top-15[15]. Even though both neighborhood selection criteria have comparable neighborhood sizes (14.7 and 15), the reverse link interference with mean threshholding selection algorithm for neighborhood determination performs substantially better because it selects neighbors in a generally more intelligent manner (as suggested by FIGS. 7A-7D).

Accordingly, the choice of distance measure or threshholding can have a significant impact on the performance of the neighborhood simplification. In FIG. 8, even though both simulation runs had approximately the same average neighborhood size, the reverse link interference with mean threshholding selection run showed significantly better results.

FIGS. 7A-7D may further illustrate the importance of the choice of selection criterion for neighborhood determination. In comparing the Δcoverage correlation graphs of similar-sized neighborhoods generated using reverse link interference with mean threshholding selection and geographic distance with Top-X selection, FIGS. 7A-7D clearly show stronger correlations in the reverse link interference with mean threshholding selection neighborhoods.

The interference-based method performs better because it generates neighborhoods more intelligently: it is able to include geographically-distant cells that have high interactions with the cell of interest while ignoring geographically-near cells that do not have much interaction. For example, as FIG. 4 shows, cell B is geographically close to A, the cell of interest, but B is also low-traffic and directed away from A. On the other hand, cell C is relatively far away from B, but C has high-traffic and is omni-directional. Reverse link interference with mean threshholding selection includes C but not B, while geographic distance with Top-X selection includes B but not C—the former is the preferred choice in this situation.

The above example demonstrates how the judicious choice of neighborhood can improve the quality of the networking monitoring data gathered for the same size of neighborhood, or alternatively how to reduce the size of the neighborhood and the concomitant costs while maintaining the quality of the network monitoring data gathered. Accordingly, use of neighborhoods may more accurately capture a network's interaction and therefore may be desirable for monitoring applications.

Choice of Neighborhood Size Affects Monitoring Accuracy and Efficiency

The choice of a neighborhood should be viewed in the context of a cost/benefit analysis for network monitoring. For example, larger neighborhoods cost more to monitor (due to monitoring equipment, computational resources such as storage and processing servers, increase in communication on backhaul etc.), while smaller neighborhoods might be less accurate. Accordingly, a judicious choice of neighborhood is desired, where the quality of the data gathered may be increased for the same number of cells, or the quality of the data maintained with a reduction in the number of well chosen cells.

Like the trade-off in monitoring, neighborhood size determination presents a trade-off in simulations between accuracy and efficiency. As shown in FIG. 6, simplifications with larger neighborhood sizes generally produce more accurate results. However, the inaccuracy decreases as neighborhood size increases because one can obtain results similar to full-evaluation solutions using a relatively small neighborhood size. The size required for results that agree with full-network evaluation may depend on the market details, but once the neighborhood is large enough to capture the behavior of the network, increasing neighborhood size simply adds cells and computation while introducing little benefit.

Therefore, a judicious choice of neighborhood in simulation may help guide the choice for network monitoring applications. However, more fundamentally, the same cost-benefit balance exists in choosing neighborhoods for network monitoring: too many cells in the neighborhood and the monitoring costs are unnecessarily high, too few cells and the quality of the data obtained from monitoring suffers.

Neighborhoods may be used in order to assess neighborhood quality for live monitoring. For example, dividing networks into neighborhoods around cells of interest could be used in assessing the size of a neighborhood required for adequate accuracy in one or more parameters to be monitored. Such a procedure may be employed to see how robust the selected neighborhood is, and/or to efficiently determine the quality of the neighborhood to be monitored for one or more specified parameters. This may also help to conserve processing resources, since one can check a selected neighborhood's robustness characteristics in advance, prior to monitoring the neighborhood for gathering specified information that reflect performance and/or status of the network.

As an example, a measurement could be made of certain events (for example call attempts) that coincide with an event in the cell of interest (for example a call failure). A parameter such as the number of such coincident events per minute may represent a parameter measure to be monitored on a local scale, e.g., for a given neighborhood. A similar parameter could be measured on a global scale, e.g. for the entire network or for a larger neighborhood. The number of events in the neighborhood may be the number of failures in the cell of interest that are coincident with call attempts in the neighborhood (instead of in the network or larger neighborhood as a whole).

To test the quality of the neighborhood to be selected for live monitoring, a correlation coefficient may be computed based on the measured parameters for the network version and the neighborhood version, in an effort to determine how well the neighborhood captured such events, and hence, may provide a relative indication of the quality or robustness of the evaluated neighborhood. The neighborhood with the highest absolute value of its coefficient may be selected as the neighborhood to be used for live monitoring of the chosen parameter(s) for assessing network status or performance. Alternatively, one may measure the desirability of a neighborhood based on a combination of a function of the correlation coefficient and the cost to monitor that particular neighborhood. The neighborhood with a desired combined score may then be chosen; in this way one can balance the cost and benefit of different possible neighborhood choices.

Given the trade-off between monitoring costs and accuracy and between simulation accuracy and efficiency, one might wonder how, given a network, one could select an accurate distance measure and/or neighborhood definition. One method for guiding neighborhood size decisions is illustrated by the correlation graphs of FIGS. 7A-7D. Similarly the correlation of first-iteration locality-greedy and conventional-greedy Δcoverage may be a relatively accurate predictor of overall locality-greedy performance. Prior to executing a complete locality-greedy run, one could first sample the first-iteration correlations with varying neighborhoods to help select appropriate parameters for the full optimization. While this example shows this method's utility for network monitoring or for locality-greedy the method can be generalized, and this correlation method can also be applied directly to a variety of measurement operations. The limited single-iteration samplings proposed herein can be chosen to require insignificant resources relative to a full conventional run. For example, the correlation between coincident events as measure globally and for different neighborhood definitions can serve to guide the appropriate selection of neighborhood definitions. These measurements, when carried out for a limited time or for a limited subset of correlated events, may be a cost effective way of assessing the utility of a neighborhood definition.

The exemplary embodiments of the present invention being thus described, it will be obvious that the same may be varied in many ways. Such variations are not to be regarded as departure from the spirit and scope of the exemplary embodiments of the present invention, and all such modifications as would be obvious to one skilled in the art are intended to be included within the scope of the following claims.

What is claimed is:

1. A method of performing live monitoring of a wireless communication network with a determinable neighborhood of cells within the network, comprising:
    selecting a given cell in the network to be evaluated,
    measuring path loss between a base station corresponding to the given cell and one or more points in each of a plurality of other cells by comparing received signal power from the base station at the one or more points in the plurality of other cells,
    determining a score for each cell in the plurality of other cells based on the path losses of the points within the plurality of other cells,
    selecting cells based on their scores as cells of a neighborhood, and
    monitoring one or more given parameters of the neighborhood to assess the status of the network; wherein
    the selected cells are not restricted to cells geographically closest to the given cell.

2. The method of claim 1, wherein the given parameters of the neighborhood to monitor include one or more of service measurements taken of the neighborhood, alarm condition in the neighborhood, signaling and data information within the neighborhood.

3. A method of performing live monitoring of a wireless communication network with a determinable neighborhood of cells within the network, comprising:
    selecting a given cell in the network to be evaluated,
    measuring path loss between a base station corresponding to the given cell and one or more points in each of a plurality of other cells by comparing received signal power from the base station at the one or more points in the plurality of other cells,
    determining a score for each cell in the plurality of other cells based on a plurality of distance metrics, said distance metrics including (i) a function of the geographic distance of each cell in the plurality of other cells from the selected cell, (ii) reverse link interference, and (iii) the measured path loss,
    selecting cells based on their scores as cells of the neighborhood, wherein the selected cells are not restricted to cells geographically closest to the given cell, and
    monitoring one or more given parameters of the neighborhood to assess the status of the network.

4. The method of claim 3, wherein the given parameters of the neighborhood to monitor include one or more of service measurements taken of the neighborhood, alarm condition in the neighborhood, signaling and data information within the neighborhood.

5. A method of performing live monitoring of a wireless communication network, comprising:
dividing the network into a plurality of neighborhoods, a neighborhood being represented by a given cell to be evaluated and one or more neighbors of the given cell, and the neighborhood being defined based on a plurality of distance metrics including (i) geographical distance of each cell in a plurality of other cells from the given cell, (ii) reverse link interference information, and (iii) path loss information between the given cell and each cell in the plurality of other cells, the path loss information representing path loss between a base station corresponding to the given cell and one or more points in the plurality of other cells, the path loss being measured by comparing received signal power from the base station at the one or more points in the plurality of other cells, wherein the neighborhood of the given cell is not restricted to cells geographically closest to the given cell;
selecting a desired neighborhood; and
monitoring one or more given parameters of the selected neighborhood to evaluate network performance.

6. The method of claim 5, wherein the given parameters of the neighborhood to monitor include one or more of service measurements taken of the neighborhood, alarm condition in the neighborhood, signaling and data information within the neighborhood.

7. The method of claim 5, wherein selecting further includes evaluating a given number of cells that are closest to the given cell based on a chosen ranking criterion, the closest X cells selected as belonging to the neighborhood to be monitored.

8. The method of claim 7, wherein the value of X is variable based on the structure of the network to be simulated.

9. The method of claim 5, wherein selecting further includes selecting the neighborhood as a function of a correlation coefficient, a value of which is indicative of the quality of the neighborhood for live network monitoring.

10. The method of claim 9, wherein selecting further includes selecting the neighborhood as a function of monitoring costs in addition to the correlation coefficient.

11. The method of claim 5, wherein selecting further includes:
performing one of a simulation and a measurement for each neighborhood to determine a first parameter for each neighborhood,
performing one of a simulation and a measurement of one of the entire network or a larger neighborhood to determine a second parameter,
determining a correlation coefficient between the first and second parameters, a value of the correlation coefficient indicative of the quality of the neighborhood for live network monitoring, and
selecting the neighborhood with the highest absolute value of its coefficient as the neighborhood to be used for live monitoring to assess network status or performance.

12. The method of claim 11, wherein the first and second parameters are the same measured or simulated parameter, the first parameter measured or simulated on a local, neighborhood scale, the second parameter measured or simulated on a global network scale or larger neighborhood scale.

* * * * *

UNITED STATES PATENT AND TRADEMARK OFFICE
CERTIFICATE OF CORRECTION

Page 1 of 1

PATENT NO. : 7,941,135 B2
APPLICATION NO. : 11/385880
DATED : May 10, 2011
INVENTOR(S) : David Abusch-Magder It is certified that error appears in the above-identified patent and that said Letters Patent is hereby corrected as shown below:

Specification

Column 1, Line 8-19 the correct Cross-Reference to Related Applications should read:

CROSS-REFERENCE TO RELATED APPLICATIONS

This application is related to co-pending U.S. patent application Ser. No. 11/072,439 to David Abusch-Magder et al., filed Mar. 7, 2005 and entitled "METHODS OF SIMPLIFYING NETWORK SIMULATION"; and to U.S. patent application Ser. No. 11/385,881 to David Abusch-Magder, filed Mar. 22, 2006 and entitled "METHOD OF CONFIGURING CELLS IN A NETWORK USING NEIGHBORHOODS AND METHOD OF DYNAMICALLY CONFIGURING CELLS IN A NETWORK USING NEIGHBORHOODS". The entire contents of each of these related applications are hereby incorporated by reference herein.

Signed and Sealed this
Fifth Day of April, 2016

Michelle K. Lee
*Director of the United States Patent and Trademark Office*